US008214536B2

(12) United States Patent
Zhao

(10) Patent No.: US 8,214,536 B2
(45) Date of Patent: *Jul. 3, 2012

(54) METHODS AND APPARATUS FOR SELECTING A WIRELESS NETWORK BASED ON QUALITY OF SERVICE (QOS) CRITERIA ASSOCIATED WITH AN APPLICATION

(75) Inventor: Wen Zhao, Kanata (CA)

(73) Assignee: Research In Motion Limited, Waterloo, Ontario (CA)

( * ) Notice: Subject to any disclaimer, the term of this patent is extended or adjusted under 35 U.S.C. 154(b) by 1018 days.

This patent is subject to a terminal disclaimer.

(21) Appl. No.: 11/940,050

(22) Filed: Nov. 14, 2007

(65) Prior Publication Data

US 2008/0062934 A1   Mar. 13, 2008

Related U.S. Application Data

(63) Continuation of application No. 10/663,599, filed on Sep. 16, 2003, now Pat. No. 7,318,111.

(51) Int. Cl.
*G06F 15/16* (2006.01)
*G06F 15/167* (2006.01)
*G06F 15/177* (2006.01)
*G06F 15/173* (2006.01)
*H04L 12/28* (2006.01)
*H04W 4/00* (2009.01)

(52) U.S. Cl. ........ 709/250; 709/206; 709/212; 709/216; 709/220; 709/223; 370/395.21; 370/332

(58) Field of Classification Search .................. 709/206, 709/212, 216, 220, 223, 224, 238, 240, 241; 370/395.21, 332

See application file for complete search history.

(56) References Cited

U.S. PATENT DOCUMENTS

| 6,680,930 | B2 | 1/2004 | Newberg et al. |
| 6,763,226 | B1 * | 7/2004 | McZeal, Jr. ................... 455/90.2 |
| 6,978,144 | B1 * | 12/2005 | Choksi ........................ 455/452.2 |
| 7,031,718 | B2 * | 4/2006 | Jouppi et al. ................... 455/450 |
| 2001/0003191 | A1 * | 6/2001 | Kovacs et al. ................. 709/226 |
| 2003/0035409 | A1 | 2/2003 | Wang et al. |
| 2005/0192020 | A1 | 9/2005 | Zhao et al. |
| 2010/0095017 | A1 * | 4/2010 | Ghetie et al. .................. 709/232 |

* cited by examiner

*Primary Examiner* — Ranodhi Serrao
*Assistant Examiner* — Farrukh Hussain
(74) *Attorney, Agent, or Firm* — John J. Oskorep, Esq.

(57) ABSTRACT

In one illustrative example, a mobile communication device has a plurality of software applications including an Internet browser application, an electronic mail (e-mail) communication application, and an audio or video player application. The mobile device is adapted to receive, from wireless communication networks or through use thereof, available quality of service data for the wireless networks and store the corresponding data in association with each network identification. The available quality of service data includes at least a bandwidth criterion and a delay criterion associated with each wireless network. For each one of the software applications, the mobile device is adapted to execute the software application; identify, based on the stored quality of service data, one or more wireless networks having a bandwidth criterion and a delay criterion that best match a bandwidth requirement and a delay requirement, respectively, of the executed software application; and select, based on the identifying, an available wireless network for communication using the executed software application.

25 Claims, 5 Drawing Sheets

METHODS AND APPARATUS FOR SELECTING A WIRELESS NETWORK BASED ON QUALITY OF SERVICE (QOS) CRITERIA ASSOCIATED WITH AN APPLICATION

CROSS REFERENCE TO RELATED APPLICATION

The present application is a continuation of and claims priority to U.S. non-provisional patent application having application Ser. No. 10/663,599 and filing date of 16 Sep. 2003, now U.S. Pat. No. 7,318,111 B2, which is hereby incorporated by reference herein.

BACKGROUND

1. Field of the Technology

The present disclosure relates generally to mobile communication devices and network selection techniques employed thereby, and more particularly to network selection techniques based on quality of service (QoS) criteria associated with software applications on a mobile device.

2. Description of the Related Art

The $3^{rd}$ Generation Partnership Project (3GPP2) Technical Specification Group (TSG)-P (data services and applications) defines four types of CDMA2000 airlink traffic classes having associated Quality of Service (QoS) attributes: (1) Conversational traffic class; (2) Streaming traffic class; (3) Interactive traffic class; and (4) Background traffic class. Conversational traffic class applications correspond to traditional voice applications which are usually two-way and sensitive to delay, delay variation, and data loss. Streaming traffic class applications are usually one-way and less sensitive to delay and data loss, but are sensitive to delay variations and may require a high bandwidth. A good example of a streaming traffic class application is a video player application. Interactive traffic class applications are two-way "bursty" types of applications. These applications can tolerate moderate delay and data loss and have variable bandwidth requirements. On-line video game and web-surfing (browser) applications are good examples of the interactive traffic class. Finally, background traffic class applications are those which are highly tolerant of delay and data loss and may have variable bandwidth requirements. Examples of these applications include e-mail and file transfer applications.

Due to historical reasons, conventional network selection methods are based largely on conversational traffic class applications (i.e. voice). The IS-683b standard, for example, defines a Preferred Roaming List (PRL) for system selection and acquisition. The PRL includes two tables: the system table and the acquisition table. The system table contains records, each of which identifies a network by its System Identification (SID) and Network Identification (NID). For each record, there is an indicator of whether the system is preferred or negative, the roaming status that should be indicated by the mobile device, the relative priority of the system, and its geographic region. Each record also contains an acquisition index which indicates a record in the acquisition table to be used. The acquisition record provides the band and frequencies that are to be used when attempting to acquire the system.

The IS-683 system selection algorithm works well for conversational traffic class applications (i.e. voice). Problems may arise, however, when different types of data applications are utilized by the mobile device. If a mobile device is operating in home network coverage, it is not guaranteed that its application requirements will be met. For example, a streaming traffic class application which requires a high bandwidth will not work if the mobile device's current network provides only a low bandwidth. As another example, a mobile device under weak signal coverage (typically resulting in high packet data loss) may serve background traffic class applications well but not interactive traffic class applications (e.g. an interactive video game). Furthermore, two different carriers may have a voice roaming agreement but not a data roaming agreement. In this case, a non-home foreign network suitable for voice may not be suitable for a data application at all. Even if a data roaming agreement existed between these carriers, the home carrier may still prohibit mobile devices from roaming onto the foreign network in cities where it provides system coverage itself. When a data call is attempted on such a foreign network, authentication failures typically occur as a result. This wastes network resources and battery life and gives the end user a poor service experience.

Accordingly, there is a need for methods and apparatus for selecting a wireless network for communication that overcomes the deficiencies of existing techniques.

BRIEF DESCRIPTION OF THE DRAWINGS

Embodiments of present disclosure will now be described by way of example with reference to attached figures, wherein.

DETAILED DESCRIPTION OF THE PREFERRED EMBODIMENTS

Methods and apparatus for selecting a wireless communication network based on quality of service criteria associated with an application are described herein. In one illustrative example, one of several different software applications of the mobile communication device is executed. The software application may be, for example, an e-mail application, an Internet data application, a voice-over-IP application, a media player application, or a video game application. Each software application is associated with different quality of service criteria for data communications through a wireless communication network. The quality of service criteria may include, for example, a bandwidth criterion, a delay criterion, a delay variation criterion, and a data loss criterion. A scanning operation is performed to identify a plurality of a wireless communication networks available in a coverage area of the mobile device. One of the identified wireless networks is selected for communication based on a match between its available quality of service and the quality of service criterion associated with the executed software application. Advantageously, the most suitable network may be chosen and utilized for each software application.

Figure 1:
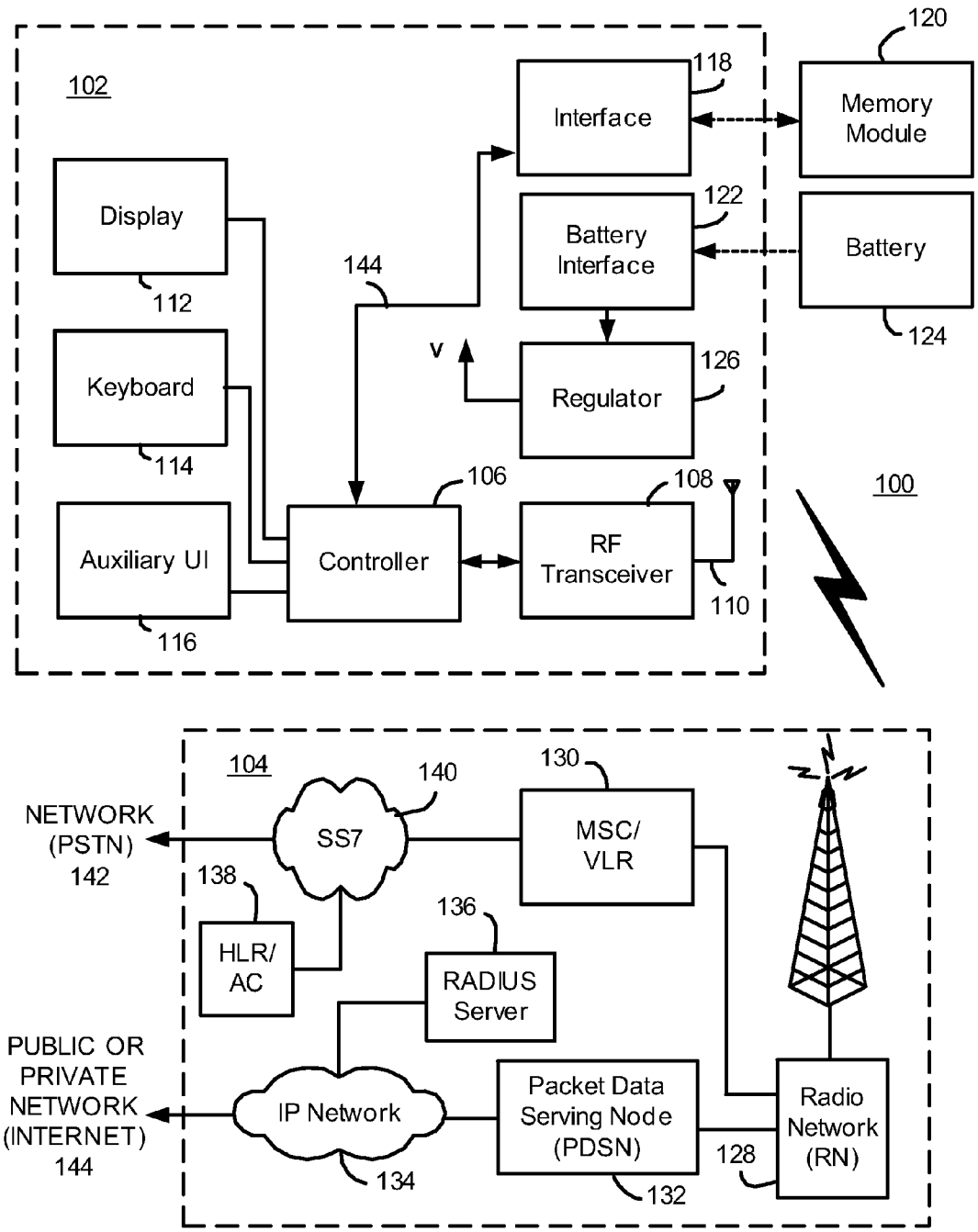
FIG. 1 is a block diagram which illustrates pertinent components of a mobile communication device which communicates within a wireless communication network.

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. Mobile station 102 may also operate using a memory module 120, such as a Subscriber Identity Module (SIM) or a Removable User Identity Module (R-UIM), which is connected to or inserted in mobile station 102 at an interface 118.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/

AC 138. In order to provide packet data services to mobile station 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
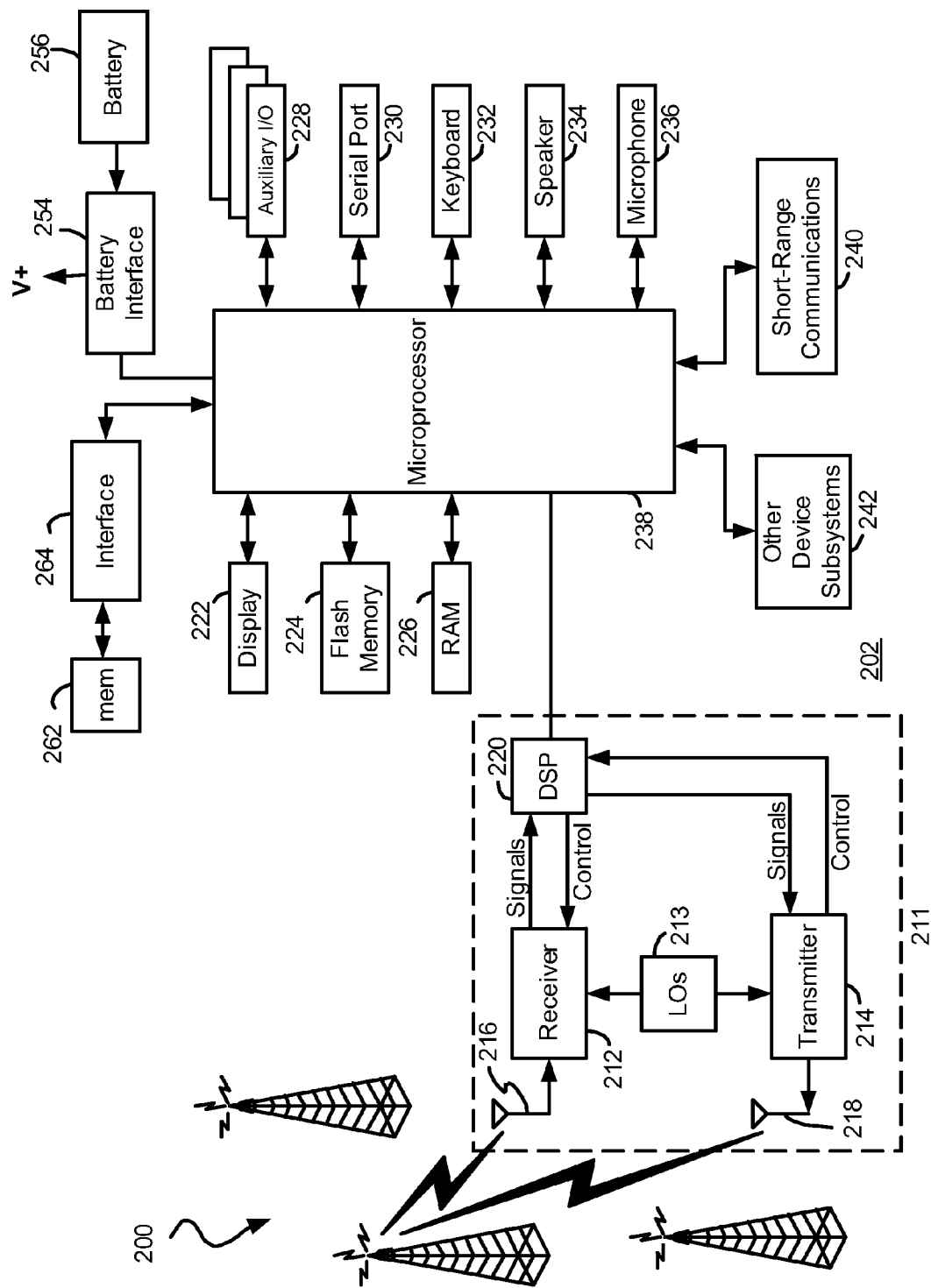
FIG. 2 is a more detailed diagram of a preferred mobile communication device of FIG. 1.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of wireless communication networks 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals through the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 may require a memory module 262, such as a Subscriber Identity Module or "SIM" card or a Removable User Identity Module (R-UIM), to be inserted in or connected to an interface 264 of mobile station 202 in order to operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. Such control includes network selection techniques of the present disclosure. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
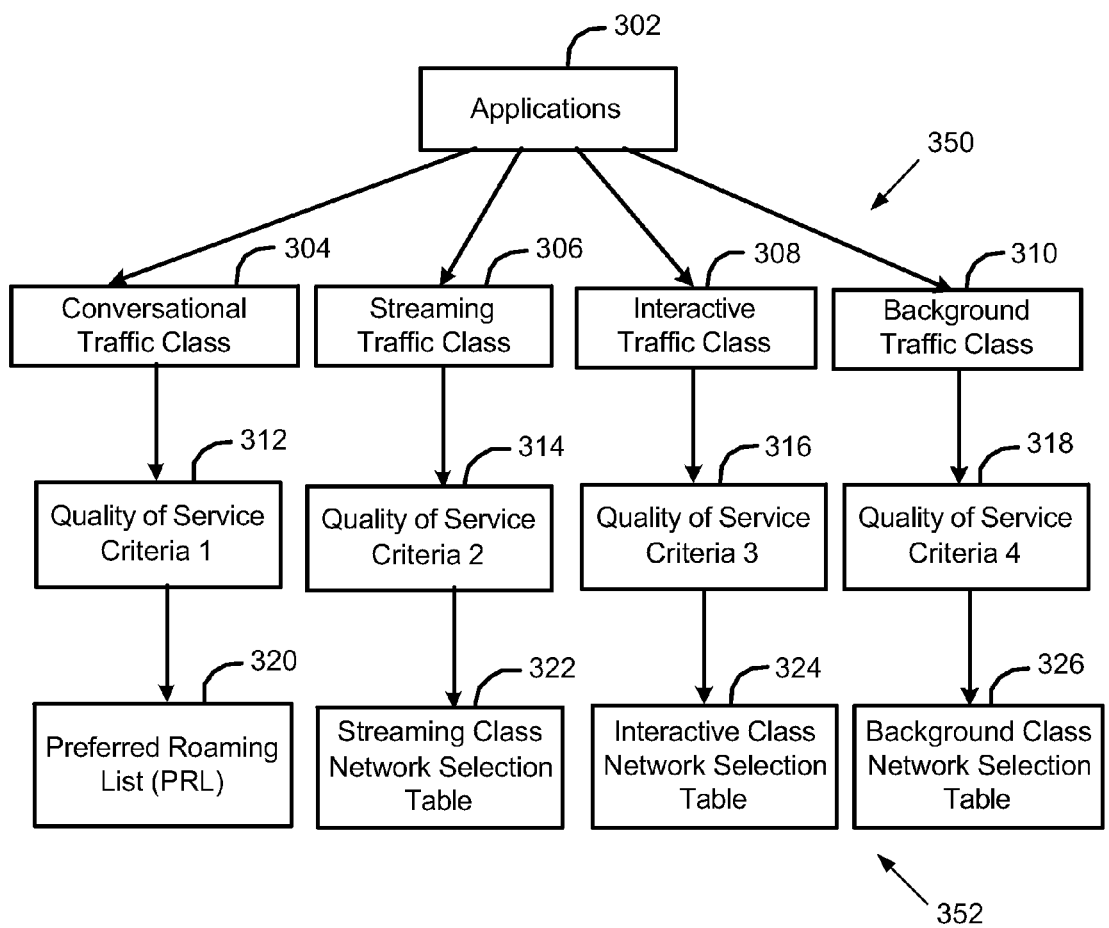
FIG. 3 is a diagram which illustrates how each software application on the mobile communication device is associated with particular quality of service (QoS) criteria for data communication.

FIG. 3 is a diagram which illustrates how each software application of the mobile communication device is associated with particular quality of service (QoS) criteria for data communications through a wireless network. The memory of the mobile device is provided with a plurality of software applications 302, each of which require data communications to be facilitated through a wireless network. Each application 302 includes one or more files containing computer instructions which are executed by a processor of the mobile device. Applications 302 may include a traditional voice call application, a video player application, an audio player application, a video game application, a voice-over-IP application, an e-mail application, and an Internet data application. Each application 302 is classified into one of a plurality of different traffic classes 350, each traffic class being associated with a different quality of service (QoS) requirement.

In the detailed present embodiment, the different traffic classes 350 include a conversational traffic class 304, a streaming traffic class 306, an interactive traffic class 308, and a background traffic class 310. The $3^{rd}$ Generation Partnership Project (3GPP2) Technical Specification Group (TSG)-P (data services and applications) defines these four types of CDMA2000 airlink traffic classes with associated QoS attributes. Conversational traffic class 304 corresponds to traditional voice applications which are usually two-way and sensitive to delay, delay variation, and data loss. Streaming traffic class 306 is usually one-way and less sensitive to delay and data loss, but sensitive to delay variations and may require a high bandwidth. A good example of a streaming traffic class application is a streaming video application. Interactive traffic class 308 is a two-way "bursty" type of application. These applications can tolerate moderate delay and data loss and have variable bandwidth requirements. On-line video game and web-surfing (browser) applications are good examples of the interactive traffic class. Finally, background traffic class 310 is highly tolerant of delay and data loss and may have a variable bandwidth requirement. Examples of these applications include e-mail and file transfer applications.

Conventional network selection methods are primarily based solely on conversational traffic class applications (i.e. voice). Techniques of the present disclosure, however, utilize quality of service (QoS) criteria to select the most accommodating network for each software application 302. As shown in FIG. 3, conversational traffic class 304 is associated with a quality of service criteria 312; streaming traffic class 306 is associated with a quality of service criteria 314; interactive traffic class 308 is associated with a quality of service criteria 316; and background traffic class 310 is associated with a quality of service criteria 318.

In general, quality of service criteria 312 associated with conversational traffic class 304 calls for a two-way connection, a relatively small delay, and a relatively small data loss, while permitting a relatively low bandwidth. Quality of service criteria 314 associated with streaming traffic class 306 calls for a relatively small delay variation and relatively high bandwidth while permitting a one-way connection, a relatively long delay, and a relatively large data loss. Quality of service criteria 316 associated with interactive traffic class 308 calls for a two-way connection while permitting a moderate delay, a moderate data loss, and a variable bandwidth. Quality of service criteria 318 associated with background traffic class 310 calls for a relatively long delay, a relatively large data loss, and a variable bandwidth.

The above description of the criteria is, of course, generalized for reasons of clarity although in practice may be tailored specifically on an application-by-application basis and may allow some flexibility. Specific examples of current bandwidth criteria include: for telephone-quality audio: $\geq 64$ kbps; for simple application sharing: $\geq 100$ kbps; for video-conferencing: $\geq 128$ kbps to 1 Mbps; for MPEG video: $\geq 1.54$ Mbps; for imaging: $\geq 8$ Mbps to 100 Mbps; for virtual reality: $\geq 100$ Mbps. Examples of current delay criteria include: for video<150 msec; and for audio<400 msec. Video bandwidth criteria may vary dramatically between different video applications and/or its requirements. For example, for high quality video (uncompressed) at 30 frames per second/(640×480 pixels)/(24-bit color)/(pixel)=221 Mbps; for reduced quality video (uncompressed) at 15 frames per second/(320×240 pixels)/(16-bit color)/pixel=18 Mbps; for 16-bit color video (uncompressed) with 320×240 pixels and CD-quality stereo sound: Video=320×240 pixels×16 bits×16 frames=19,660, 800 bps=19.7 Mbps, +Sound=16 bits×44,000 samples×2 channels=1,408,000 bps=1.4 Mbps=19.7+1.4=21.1 Mbps. Compressed video may also have varying bandwidth needs. For example, MPEG-1 compressed video may required between 1 to 3 Mbps. As examples of MPEG-2 compressed video: 35: 1-16:1 compression (quality for presentation purposes)≧5 to 10 Mbps; for 16:1-7:1 compression (betacam SP replacement)≧10 to 25 Mbps; for 7:1-2:1 compression (spectacular imaging)≧25 to 90 Mbps; and for 40:1-16:1 (DVD quality)≧3.5 to 10 Mbps. For high quality audio at 44.1 kHz sampling rate/(16-bit samples)/(2 audio channels)≧1.4 Mbps; for reduced quality audio at 11.05 kHz sampling rate/(8-bit samples)/1 audio channel)≧0.1 Mbps; and for MPEG-1 audio, layer 3 ("MP3"), a near CD-quality stereo audio stream≧128 kbps.

When the mobile device performs scanning operations to identify available wireless networks, it also identifies available quality of service data associated with each wireless network. Each available quality of service data for each wireless network is stored in association with an identifier for the wireless network. For example, the mobile device may store each available quality of service data for each wireless network in association with a System Identification (SID) for the corresponding wireless network. In addition to or in lieu of storing all of the available quality of service data in association with the SID, an indication of whether or not the network is suitable for each traffic class is stored. Some or all of the available quality of service data of the wireless networks may be identified by receiving the information from the wireless networks. For example, the available quality of service data may be received over a control channel or broadcast channel of a wireless network. Alternatively, some or all of the available quality of service data may be obtained through actual (test) use of the application through the wireless network. As another option, some or all of the available quality of service data may be pre-programmed by a service provider (e.g. for the home network) and subsequently updated by the mobile device based on actual operational history.

Broadly, the techniques of the present disclosure utilize the quality of service criteria associated with each software application to select the most suitable network for the application. In general, network selection is based on a match between the quality of service criteria of the executed software application and the available quality of service data identified for the wireless communication network.

Figure 4:
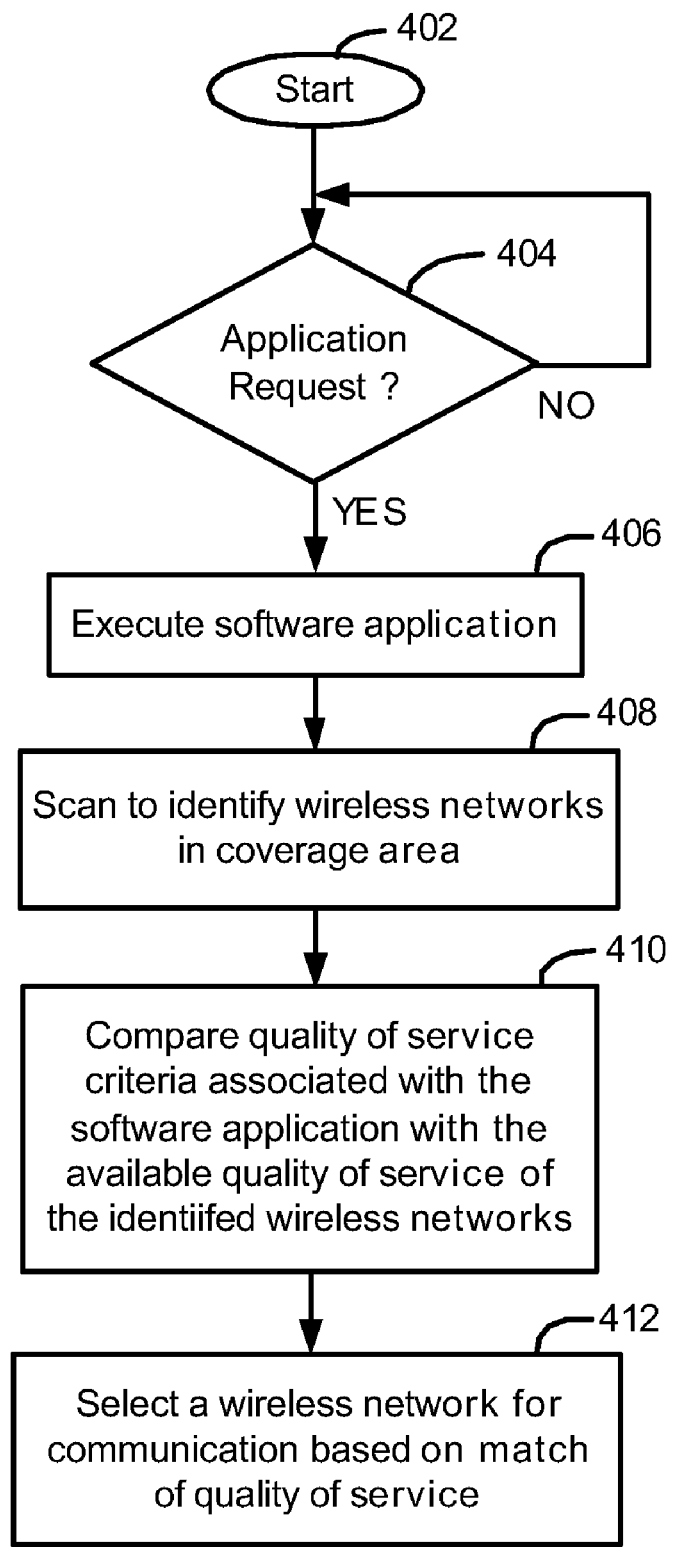
FIG. 4 is a flowchart which describes a method of selecting a wireless communication network for communication based on quality of service (QoS) criteria associated with each software application.

FIG. 4 is a flowchart which describes a method of selecting a wireless network for communication based on quality of service criteria associated with an application. The method may be performed by a mobile device described in relation to FIGS. 1-3. As previously described, there are several different software applications stored in memory of the mobile device. For example, the applications may include a traditional voice call application, a video player application, an audio player application, a video game application, a voice-over-IP application, an e-mail application, and an Internet data application. Each software application is associated with different quality of service (QoS) criteria for data communications through a wireless communication network, as previously described in relation to FIG. 3.

Beginning at a start block 402 of FIG. 4, the mobile device identifies whether a request to execute or "run" one of the software applications has been received (step 404). For example, an end user may "point-and-click" on an application icon in the display to request one of the software applications to be run. As another example, a request to execute one of the software applications may be received each time the mobile device is powered up. When such a request is received, the mobile device executes the selected software application (step 406). A scanning operation performed by the mobile device identifies a plurality of wireless communication networks available within its coverage area (step 408). Such scanning is regularly performed by the mobile station, which receives a System Identification (SID), a Mobile Country Code (MCC), and Mobile Network Code (MNC), among other things, for each available wireless network in its coverage area. This step 408 of scanning may be performed in the sequence as shown in the flowchart, or alternatively well before the application is requested in step 404.

After all of the available wireless networks are identified, the mobile device compares the quality of service criteria associated with the executed software application with an available quality of service for each of the identified wireless networks (step 410). The mobile device selects a wireless network for communication based on a match between the quality of service criteria and the available quality of service of the wireless network (step 412). The mobile device registers with this selected wireless network and establishes any necessary connections (e.g. IP and PPP connections) for the data communication. If there is no "perfect" match of quality of service, the mobile device may decline the availability of the application to the end user of the mobile device. Alternatively, if there is no perfect match the mobile device may select the most suitable network (e.g. the network having the closest matching quality of service) for the application. On the other hand, if there is more than one wireless network with matching criteria, the mobile device may select from one of the matching networks in any suitable fashion. For example, the mobile device may select one of these matching networks based on other criteria such as service cost (e.g. the network providing the least service cost for the application), signal strength (e.g. the network having the greatest received signal strength), contractual preference (e.g. the network having a preferred contractual relationship with the home network), or in an arbitrary fashion.

A single list or table of wireless network information may be utilized by the mobile device in selecting the appropriate network as previously described. Alternatively, more than one list or table may be utilized for network selection purposes. In FIG. 3, it is illustrated that a plurality of network lists/tables 352 are associated with the plurality of traffic classes 350. When one of the applications 302 is executed, its traffic class type is passed from an application layer to a radio bear service layer. The radio bear service layer selects which system selection table is used based on the traffic class type. For example, if the application belongs to conversational traffic class 304, a preferred roaming list (PRL) 320 is used for performing conventional system selection and acquisition. If the application belongs to streaming traffic class 306, a streaming class network selection table 322 is used to perform the system selection and acquisition. If the application belongs to interactive traffic class 308, an interactive class network selection table 324 is used to perform system selection and acquisition. Finally, if the application belongs to background traffic class 310, a background class network selection table 326 is used to perform the system selection and acquisition.

Streaming, interactive, and background tables 322, 324, and 326 are utilized for network selection purposes in a manner similar to PRL 320. Unlike PRL 320, however, the information in streaming, interactive, and background tables 322, 324, and 326 are not currently supplied by carriers. In the present embodiment, the radio bear service layer constructs these tables 322, 324, and 326 based on the PRL, the past service history of the same type of traffic class applications, and/or through other user configurations.

Beginning with background table 326, the radio bear service layer determines a preference (PREF_NEG) for each system identifier (SID). The mobile device attempts to make a background traffic data call through each system and, if the call could not be made successfully, the PREF_NEG for the associated SID is set to NEGATIVE, otherwise it is set to POSITIVE. A POSITIVE system in PRL 320 is not necessarily a POSITIVE in background table 326. On the other hand, a NEGATIVE in PRL 320 is usually a NEGATIVE system in background table 326. The PREF_NEG field of PRL 320 can be used to "speed up" the creation of the background table 326. In addition, the radio bear service layer also determines a priority (PRI) for each SID. PRI in the background table 326 may or may not be the same as that in PRL 320. Note that background traffic class applications 310 may have a desired bandwidth requirement. The required bandwidth typically applies for a single direction only. If the necessary bandwidth is not available, the radio bear service layer negotiates a mutually acceptable bandwidth with the network. The radio transport layer will attempt to acquire a system of which all the application's required QoS criteria can be met (at least potentially or to some extent).

Interactive table 324 is now described. As with background table 326, the radio bear service layer determines a preference (PREF_NEG) for each SID in interactive table 324. The mobile device attempts to make an interactive traffic data call through each system and, if the call could not be made successfully, the PREF_NEG for the associated SID is set to NEGATIVE, otherwise it is set to POSITIVE. A POSITIVE in PRL 320 is not necessary a POSITIVE in interactive table 324. On the other hand, a NEGATIVE system in PRL 320 is typically a NEGATIVE in interactive table 324 as well. The PREF_NEG field of the PRL 320 can be used to "speed up" the creation of interactive table 324. The radio bear service layer also determines a priority (PRI) for each SID. PRI in interactive table 324 may or may not be the same as that in PRL 320. For each SID, interactive table 324 also stores an available minimum bandwidth and an available maximum bandwidth for the forward link direction and corresponding information for the reverse link direction. When an application is executed, the application's minimum required user data rate and the end user's minimum acceptable data rate are compared with the system's available minimum and maximum bandwidths for both link directions. This comparison is used to decide whether the system should be selected to provide service for the application. Similarly, interactive table 324 stores an available minimum delay and an available maximum delay for each system SID for the forward link direction and corresponding information for the reverse link direction. When the application is executed, the application's required maximum delay for both directions are compared with the system's available minimum and maximum delays. This comparison is used to decide whether the system should be selected to provide service for the application. Interactive table 324 also stores minimum data loss and maximum data loss information which is used in the same manner as delay parameters. The radio transport layer will only attempt to acquire a system for which all the application's required QoS criteria are met.

Streaming table 322 is now described. As with interactive table 324, the radio bear service layer determines a preference (PREF_NEG) for each SID in streaming table 322. A streaming traffic data call is attempted through each system and, if the call could not be made successfully, the PREF_NEG for the associated SID is set to NEGATIVE, otherwise it is set to POSITIVE. A POSITIVE in PRL 320 is not necessarily a POSITIVE in streaming table 322. On the other hand, a NEGATIVE system in PRL 320 is typically a NEGATIVE in streaming table 322 as well. The PREF_NEG field of PRL 320 can be used to "speed up" the creation of streaming table 322. The radio bear service layer also determines a priority (PRI) for each SID. PRI in streaming table 322 may or may not be the same as that in PRL 320. For each SID, streaming table 322 also stores an available minimum bandwidth and an available maximum bandwidth for a single link direction (forward or reverse). When an application is executed, the application's minimum required user data rate and the end user's minimum acceptable data rate are compared with the system's available minimum and maximum bandwidths in the single link direction. Such comparison is used to decide whether the system should be selected to provide service for the application. Similarly, streaming table 322 stores an available minimum delay, an available maximum delay, an available minimum data loss, an available maximum data loss, an available minimum delay variation (jitter), and an available maximum delay variation for the single link direction (forward or reverse). When the application is executed, the application's criteria are compared with those made available by the system. The comparison is used to decide whether the system should be selected to provide service for the application. The radio transport layer will only attempt to acquire a system for which all the application's required QoS criteria are met.

In an alternative technique, the new system selection tables described above may be utilized in combination with the PRL provided by the network carriers to make network selection more flexible. For example, the radio bear service layer may determine the mobile device's current geographic location based on the SID currently being served and search a system that belongs to the same location able to meet the application's requirement. Such a technique may reduce system selection and acquisition time to therefore provide a better user experience.

Figure 5:
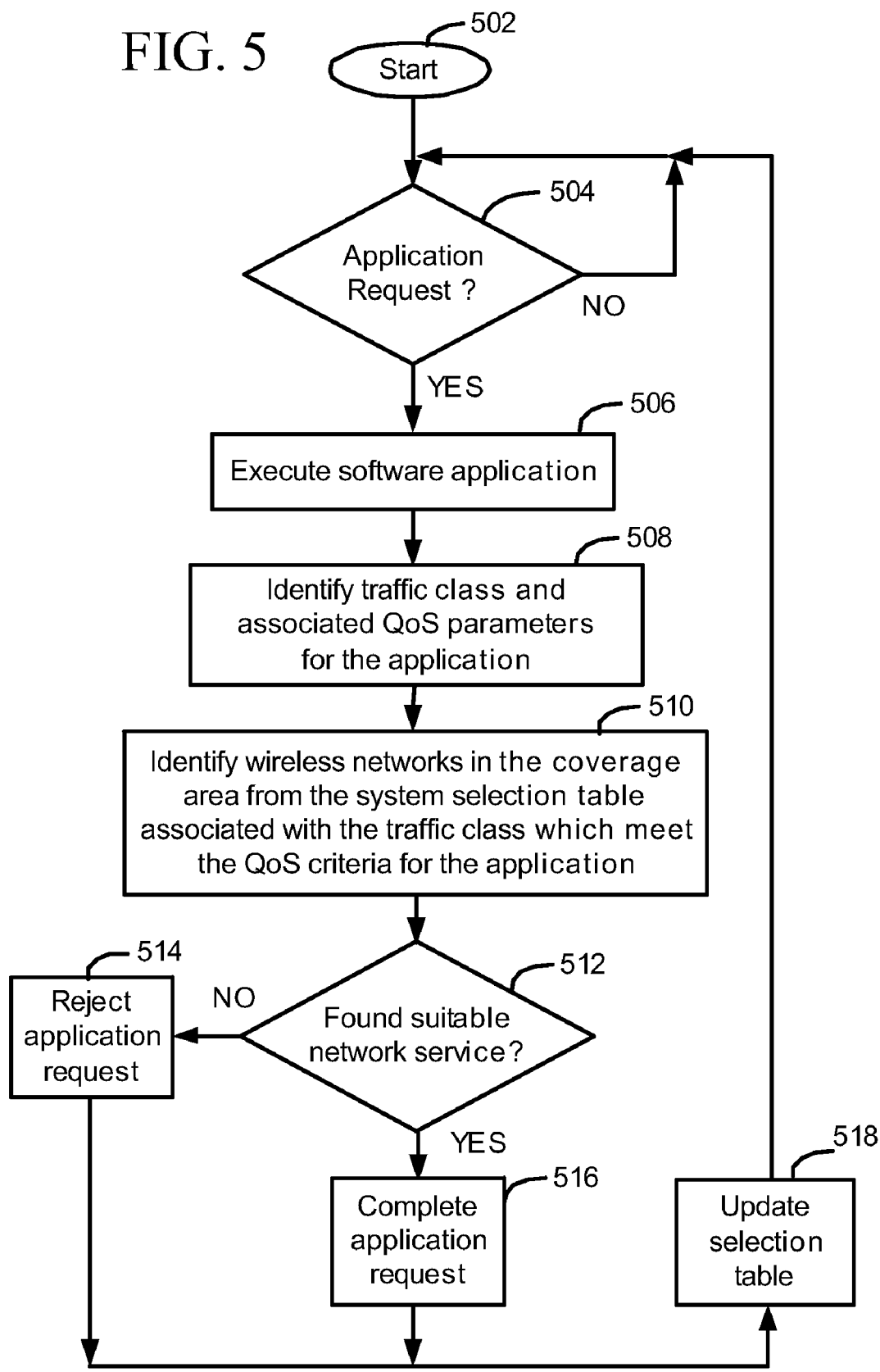
FIG. 5 is another flowchart which describes a more detailed method of selecting a wireless communication network for communication based on quality of service (QoS) criteria associated with each software application.

FIG. 5 is a flowchart which describes a more detailed method of selecting a wireless network for communication based on quality of service criteria associated with an application. This method may also be performed by a mobile device described in relation to FIGS. 1-3 and associated system selection tables. As previously described, there are several different software applications stored in memory of the mobile device. For example, the applications may include a traditional voice call application, a video player application, an audio player application, a video game application, a voice-over-IP application, an e-mail application, and an Internet data application. Each software application is associated with different quality of service (QoS) criteria for data communications through a wireless communication network. Multiple system selection tables, such as those tables shown and described in relation to FIG. 3, are also stored in the mobile device and utilized.

Beginning at a start block 502 of FIG. 5, the mobile device identifies whether a request to execute or "run" one of the software applications has been received (step 504). For example, an end user may "point-and-click" on an application icon in the display to request one of the software applications to be run. As another example, a request to execute one of the software applications may be received each time the mobile device is powered up. When such a request is received, the mobile device executes the selected software application (step 506). The mobile device identifies the traffic class and the associated QoS parameters for the executed software application (step 508) (e.g. see FIG. 3). Viewing the system selection table associated with the identified traffic class, the mobile device identifies one or more wireless networks in its coverage area that are in the system selection table and meet the associated QoS parameters (step 510).

If one or more such wireless networks are identified in step 512, then the mobile device attempts to access service for the application through these networks. Although listed in the system selection table, some or all of the networks may be unable to offer the service at that particular time. Therefore, the mobile device attempts to access service from the first prioritized system, the second prioritized system, the third prioritized system, etc., in the table until the service is granted from one of them. Assuming service is granted, the mobile device completes the application request (step 516), registering with the selected wireless network and establishing any necessary connections (e.g. IP and PPP connections) for data communication. The mobile device then updates the system selection table (step 518) with any new information regarding the network service, such as changes in parameter availability. If no such wireless networks are identified in step 512, however, then the mobile device rejects the application request (step 514), alerts the end user to this, and updates the system selection table (step 518) by marking the system as service denial (PREF_NEG=NEGATIVE) or lowering the system PRI, as examples.

Final Comments. Methods and apparatus for selecting a wireless communication network based on quality of service criteria associated with an application have been described. In one illustrative method, one of several different software applications of a mobile communication device is executed. The software application may be, for example, an e-mail application, an Internet data application, a voice-over-IP application, a video player application, an audio player application, or a video game application. Each software application is associated with different quality of service criteria for data communications through a wireless network. The quality of service criteria may include, for example, a bandwidth criterion, a delay criterion, a delay variation criterion, and a data loss criterion. The mobile device performs a scanning operation to identify a plurality of a wireless networks available in its coverage area. One of the identified wireless networks is selected for communication based on a match between its available quality of service and the quality of service criterion associated with the executed software application. Advantageously, the most suitable network may be chosen and utilized for each software application. To perform the method, a computer program product may have computer instructions stored on a computer storage medium (memory of the mobile device, a floppy disk or CD-ROM) which are written in accordance with the described logic. A mobile communication device of the present disclosure includes memory; a plurality of software applications which are stored in the memory; and one or more processors. Each software application is associated with a corresponding one of a plurality of quality of service criteria for data communications through a wireless communication network. The one or more processors are operative to execute one of the software applications; scan to identify a plurality of wireless communication networks available in a coverage area of the mobile communication device; and select one of the identified wireless communication networks for communication based on the quality of service criterion associated with the executed software application.

The above-described embodiments of the present disclosure are intended to be examples. For example, carriers may provide such new selection tables in a pre-programmed fashion. Those of skill in the art may effect modifications and variations to the particular embodiments without departing from the scope of the application. The invention described herein in the recited claims intend to cover and embrace all suitable changes in technology.

What is claimed is:

1. A method in a mobile communication device for use in selecting a wireless communication network for communications, the method comprising:
   maintaining access to a plurality of software applications stored in memory of the mobile communication device, the plurality of software applications including an Internet browser application, an electronic mail (e-mail) communication application, and an audio or video player application, each software application having a bandwidth requirement, a delay requirement, and a delay loss requirement associated therewith;
   scanning to identify a plurality of wireless communication networks available in a coverage area of the mobile communication device;
   for each one of the plurality of wireless communication networks:
      receiving, through the wireless communication network or through use thereof, available quality of service data for the wireless communication network, wherein the available quality of service data includes at least a bandwidth criterion, a delay criterion, and a data loss criterion made available by the wireless communication network;
      storing, in memory of the mobile communication device, the available quality of service data in association with a system identification of the wireless communication network;
   for each one of the software applications including the Internet browser application, the e-mail communication application, and the audio or the video player application:
      causing the software application to be executed;
      comparing, at the mobile communication device, the bandwidth, the delay, and the data loss requirements associated with the executed software application with the bandwidth, the delay, and the data loss criterions stored in the memory in association with the system identifications of the wireless communication networks;
      selecting, at the mobile communication device based on the comparing, one of the wireless communication networks that is associated with the bandwidth, the delay, and the data loss criterions that best match the bandwidth, the delay, and the data loss requirements associated with the executed software application; and
      prioritizing an attempt from the mobile communication device for system acquisition of the selected wireless communication network over the other wireless communication networks for communication using the executed software application.

2. The method of claim 1, wherein the wireless communication networks are cellular telecommunication networks.

3. The method of claim 1, further comprising:
   wherein each software application further has a delay variation requirement associated therewith;
   wherein the available quality of service data further comprise a delay variation criterion;
   wherein the comparing further comprises comparing, at the mobile communication device, the bandwidth, the delay, the delay loss, and the delay variation requirements associated with the executed software application with the bandwidth, the delay, the delay loss, and the delay variation criterions stored in the memory in association with the system identifications of the wireless communication networks; and wherein the selecting further comprises selecting, at the mobile communication device based on the comparing, one of the wireless communication networks that is associated with the bandwidth, the delay, the delay loss, and the delay variation criterions that best match the bandwidth, the delay, the delay loss, and the delay variation requirements associated with the executed software application.

4. The method of claim 1, wherein the plurality of software applications include a voice communication application, the method further comprising:

maintaining in the memory a network selection table for the voice communication application, the network selection table having a plurality of system identifications, each system identification identifying a wireless communication network and having a priority in the network selection table;

when the voice communication application is executed:
performing system selection and acquisition using the network selection table for selecting one of the wireless communication networks for communication, by attempting to access service for the voice communication application through wireless communication networks that are identified in the network selection table in accordance with the priorities associated therewith, until the service is granted from one of them.

5. The method of claim 1, further comprising:

maintaining in the memory a network selection table for the Internet browser application, the network selection table having a plurality of system identifications, each system identification identifying a wireless communication network and having a priority in the network selection table, each system identification having the stored available quality of service data associated therewith;

when the Internet browser application is executed:
performing system selection and acquisition using the network selection table for selecting one of the wireless communication networks for communication, by attempting to access service for the Internet browser application through wireless communication networks that are identified in the network selection table in accordance with the priorities associated therewith, until the service is granted from one of them.

6. The method of claim 1, further comprising:

maintaining in the memory a network selection table for the e-mail communication application, the network selection table having a plurality of system identifications, each system identification identifying a wireless communication network and having a priority in the network selection table, each system identification having the stored available quality of service data associated therewith;

when the e-mail communication application is executed:
performing system selection and acquisition using the network selection table for selecting one of the wireless communication networks for communication, by attempting to access service for the e-mail communication application through wireless communication networks that are identified in the network selection table in accordance with the priorities associated therewith, until the service is granted from one of them.

7. The method of claim 1, further comprising:

maintaining in the memory a first network selection table for the Internet browser application, the first network selection table having a plurality of system identifications, each system identification identifying a wireless communication network and having a priority in the network selection table, each system identification having the stored available quality of service data associated therewith;

when the Internet browser application is executed:
performing system selection and acquisition using the network selection table for selecting one of the wireless communication networks for communication, by attempting to access service for the Internet browser application through wireless communication networks that are identified in the network selection table in accordance with the priorities associated therewith, until the service is granted from one of them;

maintaining in the memory a second network selection table for the e-mail communication application, the second network selection table having a plurality of system identifications, each system identification identifying a wireless communication network and having a priority in the network selection table, each system identification having the stored available quality of service data associated therewith;

when the e-mail communication application is executed:
performing system selection and acquisition using the network selection table for selecting one of the wireless communication networks for communication, by attempting to access service for the e-mail communication application through wireless communication networks that are identified in the network selection table in accordance with the priorities associated therewith, until the service is granted from one of them.

8. A mobile communication device, comprising:

a wireless transceiver;

one or more processors coupled to the wireless transceiver;

memory for storing a plurality of software applications, the plurality of software applications including an Internet browser application, an electronic mail (e-mail) communication application, and an audio or video player application each software application having a bandwidth requirement, a delay requirement, and a delay loss requirement associated therewith;

the one or more processors being operative to perform a scanning operation, with use of the wireless transceiver, for identifying a plurality of wireless communication networks available in a coverage area of the mobile communication device;

the one or more processors being further operative to, for each one of the plurality of wireless communication networks:
receive, via the wireless transceiver, from the wireless communication network or through use thereof, available quality of service data for the wireless communication network, wherein the available quality of service data includes at least a bandwidth criterion, a delay criterion, and a data loss criterion made available by the wireless communication network;
store, in the memory, the available quality of service data in association with a system identification of the wireless communication network;

the one or more processors being further operative to, for each one of the software applications including the Internet browser application, the e-mail communication application, and the audio or the video player application:
execute the software application;
compare, by the one or more processors, the bandwidth, the delay, and the data loss requirements associated with the executed software application with the bandwidth, the delay, and the data loss criterions stored in the memory in association with the system identifications of the wireless communication networks;
select, by the one or more processors based on the comparing, one of the wireless communication networks that is associated with the bandwidth, the delay, and the data loss criterions that best match the bandwidth, the delay, and the data loss requirements associated with the executed software application; and
prioritize an attempt from the mobile communication device for system acquisition of the selected wireless communication network over the other wireless communication networks for communication using the executed software application.

9. The mobile communication device of claim 8, wherein the wireless communication networks are cellular telecommunication networks.

10. The mobile communication device of claim 8, further comprising:
wherein each software application further has a delay variation requirement associated therewith;
wherein the available quality of service data further comprise a delay variation criterion;
wherein the one or more processors are further operative to compare by comparing, at the mobile communication device, the bandwidth, the delay, the data loss and the delay variation requirements associated with the executed software application with the bandwidth, the delay, the data loss and the delay variation criterions stored in the memory in association with the system identifications of the wireless communication networks; and
wherein the one or more processors are further operative to select by selecting, in the one or more processors based on the comparing, one of the wireless communication networks that is associated with the bandwidth, the delay, the data loss and the delay variation criterions that best match the bandwidth, the delay, the data loss and the delay variation requirements associated with the executed software application.

11. The mobile communication device of claim 8, wherein the plurality of software applications include a voice communication application, and the one or more processors are further operative to:
maintain in the memory a network selection table for the voice communication application, the network selection table having a plurality of system identifications, each system identification identifying a wireless communication network and having a priority in the network selection table; and
when the one or more processors execute the voice communication application: perform system selection and acquisition using the network selection table for selecting one of the wireless communication networks for communication, by attempting to access service for the voice communication application through wireless communication networks that are identified in the network selection table in accordance with the priorities associated therewith, until the service is granted from one of them.

12. The mobile communication device of claim 8, wherein the one or more processors are further operative to:
maintain in the memory a network selection table for the Internet browser application, the network selection table having a plurality of system identifications, each system identification identifying a wireless communication network and having a priority in the network selection table, each system identification having the stored available quality of service data associated therewith; and
when the Internet browser application is executed: perform system selection and acquisition using the network selection table for selecting one of the wireless communication networks having the best match for communication, by attempting to access service for the Internet browser application through wireless communication networks that are identified in the network selection table in accordance with the priorities associated therewith, until the service is granted from one of them.

13. The mobile communication device of claim 8, wherein the one or more processors are further operative to:
maintain in the memory a network selection table for the e-mail communication application, the network selection table having a plurality of system identifications, each system identification identifying a wireless communication network and having a priority in the network selection table, each system identification having the stored available quality of service data associated therewith; and
when the e-mail communication application is executed: perform system selection and acquisition using the network selection table for selecting one of the wireless communication networks having the best match for communication, by attempting to access service for the e-mail communication application through wireless communication networks that are identified in the network selection table in accordance with the priorities associated therewith, until the service is granted from one of them.

14. The mobile communication device of claim 8, wherein the one or more processors are further operative to:
maintain in the memory a first network selection table for the Internet browser application, the first network selection table having a plurality of system identifications, each system identification identifying a wireless communication network and having a priority in the network selection table, each system identification having the stored available quality of service data associated therewith;
when the Internet browser application is executed: perform system selection and acquisition using the network selection table for selecting one of the wireless communication networks having the best match for communication, by attempting to access service for the Internet browser application through wireless communication networks that are identified in the network selection table in accordance with the priorities associated therewith, until the service is granted from one of them;
maintain in the memory a second network selection table for the e-mail communication application, the second network selection table having a plurality of system identifications, each system identification identifying a wireless communication network and having a priority in the network selection table; and
when the e-mail communication application is executed: perform system selection and acquisition using the network selection table for selecting one of the wireless communication networks having the best match for communication, by attempting to access service for the e-mail communication application through wireless communication networks that are identified in the network selection table in accordance with the priorities associated therewith, until the service is granted from one of them.

15. A method in a mobile communication device for use in selecting a wireless communication network for communications, the method comprising the acts of:
maintaining access to a plurality of software applications stored in memory of the mobile communication device, the plurality of software applications including a voice communication application, an Internet browser application, and an electronic mail (e-mail) communication application, each software application having a bandwidth requirement, a delay requirement, and a delay loss requirement associated therewith;
scanning to identify a plurality of wireless communication networks in a coverage area of the mobile communication device;
for each one of the plurality of wireless communication networks:
receiving, through the wireless communication network or through use thereof, available quality of service data for the wireless communication network, wherein the available quality of service data includes at least a bandwidth criterion, a delay criterion, and a delay loss criterion made available by the wireless communication network;
storing, in the memory, the available quality of service data in association with a system identification of the wireless communication network;
maintaining in the memory a network selection table for the voice communication application, the network selection table having a plurality of system identifications, each system identification identifying a wireless communication network and having a priority in the network selection table;
for the voice communication application:
causing the voice communication application to be executed;
performing system selection and acquisition using the network selection table for selecting one of the wireless communication networks for voice communication, by attempting to access service for voice communication through one or more wireless communication networks that are identified in the network selection table in accordance with the priorities associated therewith, until the voice service is granted from one of them;
for each one of the Internet browser application and the e-mail communication application:
causing the software application to be executed;
comparing, at the mobile communication device, the bandwidth, the delay, and the delay loss requirements associated with the executed software application with the bandwidth, the delay, and the delay loss criterions stored in the memory in association with the system identifications of the wireless communication networks;
selecting, at the mobile communication device based on the comparing, one of the wireless communication networks that is associated with the bandwidth, the delay, and the delay loss criterions that best match the bandwidth, the delay, and the delay loss requirements associated with the executed software application; and
prioritizing an attempt from the mobile communication device for system acquisition of the selected wireless communication network over the other wireless communication for communication using the executed software application.

16. The method of claim 15,
wherein the wireless communication networks are cellular telecommunication networks.

17. The method of claim 15, further comprising:
wherein each software application further has a delay variation requirement associated therewith;
wherein the available quality of service data further comprise a delay variation criterion;
wherein the comparing further comprises comparing, at the mobile communication device, the bandwidth, the delay, the delay loss, and the delay variation requirements associated with the executed software application with the bandwidth, the delay, the delay loss, and the delay variation criterions stored in the memory in association with the system identifications of the wireless communication networks; and
wherein the selecting further comprises selecting, at the mobile communication device based on the comparing, one of the wireless communication networks that is associated with the bandwidth, the delay, the delay loss, and the delay variation criterions that best match the bandwidth, the delay, the delay loss, and the delay variation requirements associated with the executed software application.

18. The method of claim 15, further comprising:
maintaining in the memory a network selection table for the Internet browser application, the network selection table having a plurality of system identifications, each system identification identifying a wireless communication network and having a priority in the network selection table, each system identification having the stored available quality of service data associated therewith;
when the Internet browser application is executed:
performing system selection and acquisition using the network selection table for selecting one of the wireless communication networks having the best match for communication, by attempting to access service for the Internet browser application through wireless communication networks that are identified in the network selection table in accordance with the priorities associated therewith, until the service is granted from one of them.

19. The method of claim 15, further comprising:
maintaining in the memory a network selection table for the e-mail communication application, the network selection table having a plurality of system identifications, each system identification identifying a wireless communication network and having a priority in the network selection table, each system identification having the stored available quality of service data associated therewith;
when the e-mail communication application is executed:
performing system selection and acquisition using the network selection table for selecting one of the wireless communication networks having the best match for communication, by attempting to access service for the e-mail communication application through wireless communication networks that are identified in the network selection table in accordance with the priorities associated therewith, until the service is granted from one of them.

20. The method of claim 15, wherein the plurality of software applications further include an audio or video player application, the method comprising the further acts of:
for the audio or the video player application:
causing the software application to be executed;
identifying, at the mobile communication device based on the stored available quality of service data in the memory, one of the wireless communication networks having the bandwidth criterion, the delay criterion, and the delay loss criterion that best match a bandwidth requirement, a delay requirement, and a delay loss requirement, respectively, associated with the executed software application; and
prioritizing an attempt for system acquisition of the wireless communication network having the best match for communication using the executed software application over the other wireless communication networks based on the act of identifying.

21. A mobile communication device, comprising:
a wireless transceiver;
one or more processors coupled to the wireless transceiver;
memory for storing a plurality of software applications, the plurality of software applications including a voice communication application, an Internet browser application, and an electronic mail (e-mail) communication application, each software application having a bandwidth requirement, a delay requirement, and a delay loss requirement associated therewith;
the one or more processors being operative to perform a scanning operation, with use of the wireless transceiver, for identifying a plurality of wireless communication networks available in a coverage area of the mobile communication device;
the one or more processors being further operative to, for each one of a plurality of wireless communication networks:
receive, via the wireless transceiver, from the wireless communication network or through use thereof, available quality of service data for the wireless communication network, wherein the available quality of service data includes at least a bandwidth criterion, a delay criterion, and a delay loss criterion associated with the wireless communication network;
store in the memory the available quality of service data in association with a system identification of the wireless communication network;
the one or more processors being further operative to maintain access to a network selection table stored in the memory for the voice communication application, the network selection table having a plurality of system identifications, each system identification identifying a wireless communication network and having a priority in the network selection table;
the one or more processors being further operative to, for the voice communication application:
execute the voice communication application;
perform system selection and acquisition using the network selection table for selecting one of the wireless communication networks for voice communication, by attempting to access service for voice communication through one or more wireless communication networks that are identified in the network selection table in accordance with the priorities associated therewith, until the voice service is granted from one of them;
the one or more processors being further operative to, for each application of the Internet browser application and the e-mail communication application:
execute the software application;
compare, by the one or more processors, the bandwidth, the delay, and the delay loss requirements associated with the executed software application with the bandwidth, the delay, and the delay loss criterions stored in the memory in association with the system identifications of the wireless communication networks;
select, by the one or more processors based on the comparing, one of the wireless communication networks that is associated with the bandwidth, the delay, the delay loss criterions that best match the bandwidth, the delay, and the delay loss requirements associated with the executed software application; and
prioritize an attempt from the mobile communication device for system acquisition of the selected wireless communication network over the other wireless communication networks for communication using the executed software application.

22. The mobile communication device of claim 21, wherein the wireless communication networks comprise cellular telecommunication networks.

23. The mobile communication device of claim 21, further comprising:
wherein each software application further has a delay variation requirement associated therewith;
wherein the available quality of service data further comprise a delay variation criterion;
wherein the one or more processors are further operative to compare by comparing, at the mobile communication device, the bandwidth, the delay, the delay loss, and the delay variation requirements associated with the executed software application with the bandwidth, the delay, the delay loss, and the delay variation criterions stored in the memory in association with the system identifications of the wireless communication networks; and
wherein the one or more processors are further operative to select by selecting, in the one or more processors based on the comparing, one of the wireless communication networks that is associated with the bandwidth, the delay, the delay loss, and the delay variation criterions that best match the bandwidth, the delay, the delay loss, and the delay variation requirements associated with the executed software application.

24. The mobile communication device of claim 21, further comprising:
the one or more processors are further operative to maintain a network selection table stored in the memory for the e-mail communication application, the network selection table having a plurality of system identifications, each system identification identifying a wireless communication network and having a priority in the network selection table; and
the one or more processors being further operative to, when the e-mail communication application is executed: performing system selection and acquisition using the network selection table for selecting one of the wireless communication networks having the best match for communication, by attempting to access service for the e-mail communication application through wireless communication networks that are identified in the network selection table in accordance with the priorities associated therewith, until the service is granted from one of them.

25. The mobile communication device of claim 21, wherein the plurality of software applications further include an audio or video player application, the mobile communication device further comprising:
the one or more processors being further operative to, for the audio or the video player application:
cause the software application to be executed;
identify, in the one or more processors based on the stored available quality of service data in the memory, one of the wireless communication networks having the bandwidth criterion, the delay criterion, and the delay loss criterion that best match a bandwidth requirement, a delay requirement, and the delay loss requirement, respectively, associated with the executed software application; and
prioritize an attempt for system acquisition of the wireless communication network having the best match for communication using the executed software application over the other wireless communication networks based on the act of identifying.

* * * * *